United States Patent
Markman et al.

(12)

(10) Patent No.: US 10,724,459 B2
(45) Date of Patent: Jul. 28, 2020

(54) APPARATUS FOR CONTROLLING TORQUE CONTROL FEEDBACK AND USES THEREOF

(71) Applicant: HONDA MOTOR CO., LTD., Minato-ku, Tokyo (JP)

(72) Inventors: Thomas J. Markman, Plain City, OH (US); Tomoharu Hozumi, Dublin, OH (US); Joaquin A. Pelaez, Hilliard, OH (US); Andrew G. Shapiro, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/006,616

(22) Filed: Jun. 12, 2018

(65) Prior Publication Data

US 2019/0376462 A1    Dec. 12, 2019

(51) Int. Cl.
| | |
|---|---|
| F02D 41/14 | (2006.01) |
| F02P 5/04 | (2006.01) |
| F02D 41/00 | (2006.01) |
| F02P 5/15 | (2006.01) |
| F02D 41/18 | (2006.01) |

(Continued)

(52) U.S. Cl.
CPC ..... *F02D 41/1401* (2013.01); *F02D 41/0002* (2013.01); *F02D 41/0215* (2013.01); *F02D 41/16* (2013.01); *F02D 41/18* (2013.01); *F02P 5/045* (2013.01); *F02P 5/1502* (2013.01); *F02D 2200/022* (2013.01); *F02D 2200/0402* (2013.01); *F02D 2200/0616* (2013.01); *F02D 2200/101* (2013.01); *F02D 2200/50* (2013.01); *F02D 2200/501* (2013.01); *F02D 2250/18* (2013.01)

(58) Field of Classification Search
CPC .. F02D 41/1401; F02D 41/0215; F02D 41/16; F02D 41/18; F02D 41/0002; F02D 2041/1409; F02D 2200/542; F02D 2200/022; F02D 2200/0402; F02D 2200/0616; F02D 2200/501; F02D 2200/50; F02D 2200/101; F02D 2250/101; F02P 5/1502; F02P 5/045
See application file for complete search history.

(56) References Cited

U.S. PATENT DOCUMENTS

| | | | | |
|---|---|---|---|---|
| 5,211,082 A | * | 5/1993 | Sasaki | F16H 61/16 475/119 |
| 5,421,793 A | | 6/1995 | Kashiwabara | |

(Continued)

FOREIGN PATENT DOCUMENTS

| | | |
|---|---|---|
| CN | 103047032 A | 4/2013 |
| CN | 103183022 A | 7/2013 |
| CN | 103183026 A | 7/2013 |

*Primary Examiner* — George C Jin
(74) *Attorney, Agent, or Firm* — Arent Fox LLP

(57) ABSTRACT

An apparatus, method, and system for controlling the torque of an internal combustion engine during certain vehicle component operations to minimize unwanted motion and vibration. The method includes detecting at least one of reverse gear engagement or reverse movement of the vehicle; wherein a feedback control of the internal combustion engine is switched from open-loop control to closed-loop control upon detection of at least one of a reverse gear activation or reverse movement of the vehicle.

15 Claims, 7 Drawing Sheets

(51) Int. Cl.
*F02D 41/16* (2006.01)
*F02D 41/02* (2006.01)

(56) References Cited

U.S. PATENT DOCUMENTS

| | | | | |
|---|---|---|---|---|
| 5,836,851 A * | 11/1998 | Ruman | ............... | F02B 61/045 |
| | | | | 477/107 |
| 6,863,639 B1 * | 3/2005 | Inoue | ............... | F16H 61/16 |
| | | | | 477/116 |
| 7,229,381 B2 | 6/2007 | Niessen et al. | | |
| 8,332,109 B2 | 12/2012 | Otanez et al. | | |
| 8,439,012 B2 | 5/2013 | Martin et al. | | |
| 8,532,889 B2 | 9/2013 | Demarco et al. | | |
| 9,850,829 B2 * | 12/2017 | Ito | ............... | F02D 31/001 |
| 2010/0050605 A1 * | 3/2010 | Thanasiu | ............... | F01N 9/00 |
| | | | | 60/286 |
| 2012/0245808 A1 * | 9/2012 | Shiraki | ............... | F02D 41/021 |
| | | | | 701/51 |

* cited by examiner

APPARATUS FOR CONTROLLING TORQUE CONTROL FEEDBACK AND USES THEREOF

FIELD OF THE INVENTION

Aspects of the present disclosure relate to an engine feedback control and method and system for use with an internal combustion engine. More specifically, aspects of the present disclosure relate to a device, system, and method for managing feedback torque control of an internal combustion engine.

BACKGROUND

Vehicle manufacturers continually strive to improve fuel economy and reduce emissions while meeting customer expectations for performance and drivability. The availability of increasingly more powerful powertrain control computers and/or other features has enabled more precise control of the vehicle powertrain and more efficient use of available energy. Further, In motor vehicles, particularly vehicles powered with an internal combustion engine, it is desirable to control or reduce noise and/or vibration while allowing for efficient warm-up of the engine. One cause of vibration is the internal combustion engine itself, as well as other components of the driveline, such as an automatic transmission. An internal combustion engine idle speed is frequently referred to in rotations per minute ("RPM"). Variances in idling RPM of an internal combustion engine during various operating conditions, such as when a vehicle is in neutral or when a vehicle brake is applied while the vehicle is in a forward or reverse gear, may cause undesirable noise or vibration that would not be apparent during normal operation of the vehicle. Further, during a vehicle idling operation, variables such as coolant temperature, air-temperature, fuel composition, and engine and transmission tolerances, wear, and engine and transmission dynamics may have an effect on the idle conditions of the internal combustion engine. In order to manage engine torque at idle speeds, an open-loop or feed forward torque feedback control and/or a closed-loop feedback torque feedback control may be used to improve at least one of engine control, engine efficiency, engine noise, and/or vibration characteristics.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Among other things, aspects of the present disclosure allow for switching between an open-loop feedback control and a closed-loop feedback control for controlling an engine torque during vehicle idling. In accordance with one aspect of the disclosure, a method, device, and system are disclosed for controlling the torque of an internal combustion engine of a vehicle. The method, device, and system include features and operations for detecting at least one of a reverse gear activation and a reverse movement of the vehicle; wherein a feedback control of the internal combustion engine is switched from an open-loop control to a closed-loop control upon detection of at least one of a reverse gear activation and/or a reverse movement of the vehicle.

In accordance with another aspect of the disclosure, various features and operations according to a method, system, and device are disclosed for providing instructions which, when executed by a computer, cause the computer to carry out a method for controlling an idle speed of an internal combustion engine of a vehicle. The method, device, and system include detecting at least one of a reverse gear activation and a reverse movement of the vehicle; wherein a feedback control of the internal combustion engine is switched from an open-loop control to a closed-loop control upon detection of at least one of a reverse gear activation and/or a reverse movement of the vehicle.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

Aspects of the disclosure relate to a powertrain control system, device, and/or methods of use thereof. During an operation of a vehicle, specifically at a startup and idling of the vehicle's engine, the torque of a vehicle's engine may be controlled on a feed forward basis prior to an engine water and/or coolant (hereinafter interchangeably referred to as a coolant) temperature reaching a threshold value. Open-loop or feedforward torque control may be used when a coolant temperature is below a threshold value during the warm-up cycle, for example, or until a threshold water temperature is reached, and after the threshold coolant temperature is reached, the engine torque control may switch to a closed-loop feedback based torque control.

Figure 1:
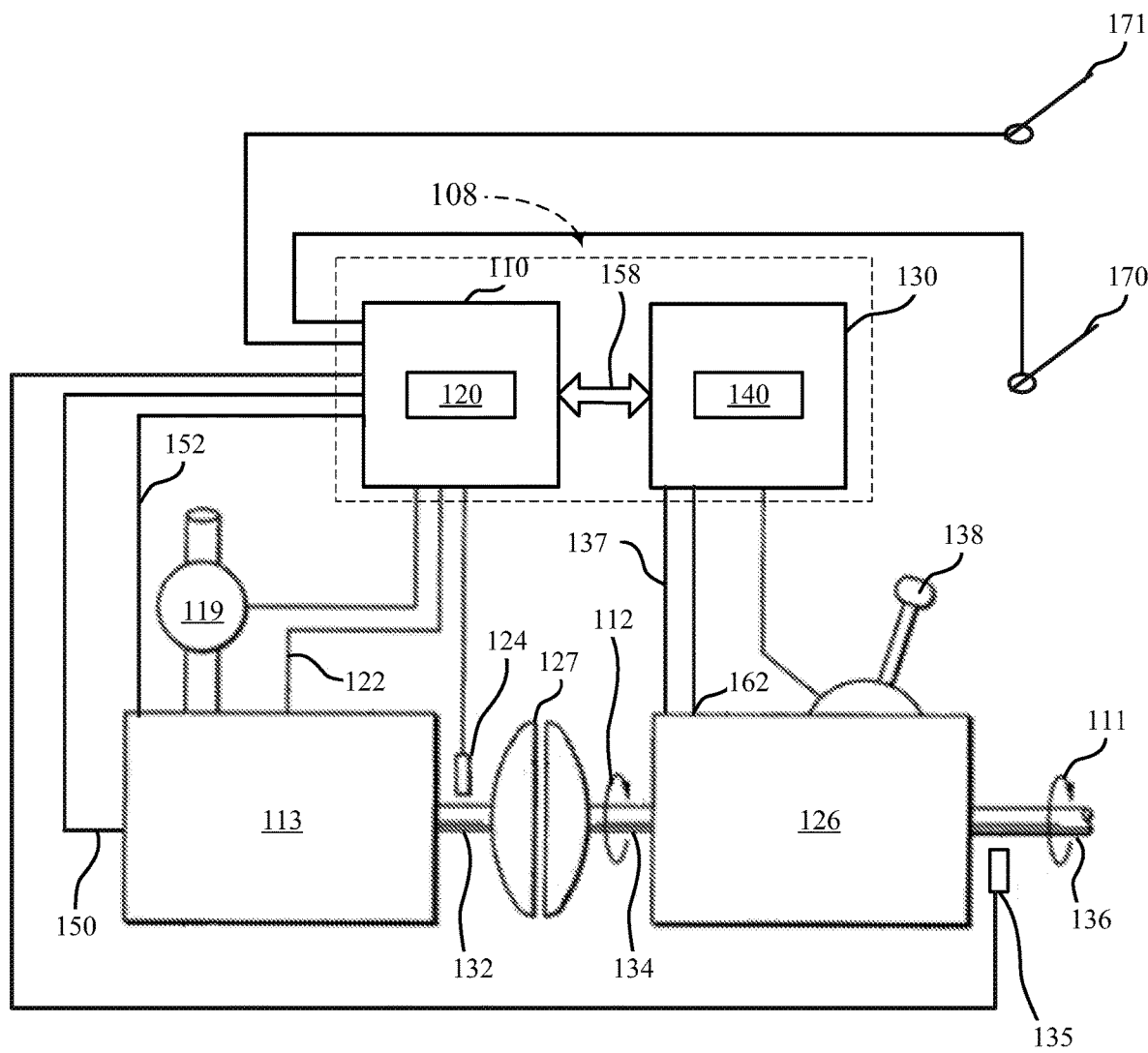
FIG. 1 is a representative block diagram of various example elements of a powertrain and control system usable with various aspects of the disclosure.

A representative diagram of various example system components and features relating to a powertrain control system, device, and method usable in accordance with aspects of the current disclosure is shown in FIG. 1. It is noted that, while several components are shown in FIG. 1, the diagram is for illustrative purposes and is not limiting. For simplicity purposes, the diagram of FIG. 1 is not intended to be an exhaustive diagram of all vehicle systems, nor is it intended to show all systems usable in accordance with aspects of the current disclosure.

The disclosure relates to a powertrain control system and methods of use. The powertrain apparatus and system features shown in FIGS. 1-7 may include similar components; however, various differences may be noted throughout the disclosure. The figures and corresponding description are intended to show various examples that may be used separately or in combination. FIG. 1 shows, in representative diagram form, example components of a powertrain and control system of a vehicle useable with various aspects of the current disclosure. As shown in FIG. 1, a vehicle may powertrain 100 may include an internal combustion engine 113, and a transmission 126. The internal combustion engine 113 may include a crankshaft 132, which may be connected to a torque converter and/or clutch assembly 127. The other side of the torque converter and/or clutch assembly 127 may provide an input torque 112 to an input shaft 134 of the transmission 126. The transmission 126 may provide an output torque 111 at an output shaft 136, which may be connected a transfer case, a driveshaft, a differential, and/or axles, for example. The transmission 126 may be electronically controlled and may have at least one gear engagement control input 138 (also interchangeably referred to herein as a gear selector) for engaging a single or plurality of drive gear(s) and a neutral gear in the transmission. The engine 113 may further include an air control valve 119 for providing combustion air to the engine 113. The air control valve 119 may, for example, be or include a throttle plate or the like that provides air to the engine at least partially in response to an input at an accelerator or gas pedal 170. In one example, the air control valve 119 may be mechanically connected to an electric or other actuator comprising e.g., an electric motor or solenoid, so as to have its valve opening controlled via the actuator. The actuator may be electrically connected to the engine portion 110 of a powertrain control module 108 (PCM), for example, which may control the opening of the air control valve 119 via the actuator. An air control valve opening sensor may be connected to the air control valve 119 for generating an electric or other signal to the engine control portion 110 indicative of opening of the sensed throttle valve.

The idle air control valve 119, and/or a fuel supply (not shown), and/or an engine ignition (not shown) may be varied so as to control engine idle speed. Further, any one of engine speed, air flow, and/or fuel supply may be used in combination with the engine speed to map an estimated torque produced by the engine. A spark angle and/or ignition timing control line 122 connected to the PCM 108 may control the ignition angle and/or timing of the internal combustion engine 113. The PCM 108 may further be in signal communication with a single or plurality exhaust sensor(s) located within or in proximity to the engine 113. The exhaust sensor(s) via communication 150 may output a signal corresponding with the composition, temperature, and/or flow of exhaust gas from engine 113.

As shown in FIG. 1, the PCM 108 may include an engine control portion 110 and a transmission control portion 130. The portions 110, 130 may be in signal communication via a communication channel 158. In one example, each one of the engine portion 110 and the transmission portion 130 may have its own microprocessor, with the communications channel 158 comprising a dual-port random access memory (DPRAM) and/or communication bus in a communications path between the engine portion 110 and the transmission portion 130. In another aspect, the engine portion 110 and the transmission portion 130 may be or include physically separated controllers, with the communications channel 158 comprising a network for communication between them. In yet another aspect, PCM 108 may have a single microprocessor, with each of the transmission portion 130 and the engine portion 110 being implemented in software within a single memory location.

Each of the transmission portion 130 and the engine portion 110 may execute instructions from its respective memory 140 and 120. The instructions may, for example, provide operation direction to the engine and/or transmission as described further below. Engine portion 110 may receive a throttle signal from gas or accelerator pedal position sensor 170, for example, and also may receive a crankshaft signal from a crankshaft sensor 124. Further, the engine portion 110 may receive a brake function active signal from at least one brake switch 171. The brake switch 171 may include a brake pedal switch and/or a parking brake switch, for example. The brake switch 171 may further include a brake pedal position monitoring sensor and/or may include a parking brake position monitoring sensor, for example. The brake switch may further include a pressure sensor and/or a position sensor for determining a brake pedal position or the speed and force at which a user presses a brake pedal. Further, the brake switch 171 may provide a brake function active signal in response to brakes being automatically applied to a single or multiple wheels of a vehicle during a traction control, anti-lock braking, and/or hill start assist event, for example. Further, in combination with or as an alternative to the aforementioned pedal and/or parking brake switches, the brake switch 171 may include one or more sensors at a single one of or at each of a plurality of wheels of the vehicle.

An exhaust sensor may provide, for example, an exhaust flow rate, an exhaust composition and/or a catalyst temperature signal via communication 150 to the engine portion 110. An engine temperature sensor or plurality of sensors, which may for example be or include one or more engine coolant temperature sensor(s), may provide a signal via communication 152 to the engine portion 110. One example of an engine temperature sensor may be a thermistor or the like, mounted in the cylinder block of the engine, which is filled with engine coolant. The sensor may supply an electric signal indicative of the sensed engine coolant temperature. Further, any of the aforementioned sensor data may be simulated or estimated by the respective engine portion 110 and/or transmission portion 130 of the PCM 108.

The transmission portion 130, may further receive a signal from a gear selector switch 138. A transmission temperature sensor or plurality of sensors, which may for example be or include one or more transmission fluid temperature sensor(s), may provide a signal via communication 162 to the transmission portion 130. In one example, the transmission portion 130 may further receive a signal corresponding to the position in which an operator places the gear selector 138. Some non-limiting examples of gear lever positions and a corresponding gear selection signals that may be generated corresponding hereto include neutral ("N") Drive ("D") and reverse ("R"). In one example, the transmission portion 130 may receive the gear selection signal as a message from a vehicle network arrangement. A speed sensor 135 may provide RPM data relating to output shaft 36. Further, either in combination with or as an alternative thereto, the speed sensor 135 may include a single or plurality of sensors to output a signal corresponding with the rotation of any single one of or a combination of the wheels of the vehicle. Further, the speed sensor 135 may combine sensed input with global positioning system ("GPS") information, for example, to determine a vehicle speed and/or acceleration. In one example operation of the aforementioned components, when the transmission 126 is in an N gear, the output torque 111 may be approximately zero. Conversely, when the transmission 126 is in a D gear, the output torque 111 may be a multiple of or fraction of input torque 134.

During normal idling operation of the engine, an engine may be controlled via a closed-loop feedback system to maintain or converge to a target rotational speed and torque. Some examples of system components that may be subject to feedback control processes are the ignition angle or timing and the position of a throttle plate (e.g., control valve 119 in FIG. 1). Further, at least some of the system components of the transmission may further be controlled via a closed-loop feedback system. Some examples of systems within the transmission subject to feedback control processes are torque converter lock-up and/or control and transmission line pressure.

In any of the examples mentioned throughout the specification, a closed-loop feedback system may use general feedback control algorithms, such as proportional integral derivative ("PID") control algorithms, proportional integral ("PI") control algorithms, and/or response-specifying control algorithms, such as back-stepping control algorithms and sliding mode control algorithms. Feedback control of the aforementioned system components may be based on a number of factors, one of which may include an engine and/or transmission temperature. For example, coolant temperature, oil temperature, and/or engine block temperature may be monitored within the engine. As another example, transmission fluid and/or transmission block temperature may be monitored within the transmission.

During an idling process, the torque of the engine may be controlled to prevent stalling, reduce noise and/or vibration, and/or prevent surging or other irregularities that are detectable by an occupant of the vehicle. When controlling an engine output torque at idle once the engine has reached a certain operating temperature, a closed-loop feedback system may be employed. For example, various engine parameters, which may include an engine output speed, a flow of air into the engine, and/or ignition timing or angle may be monitored. Based on the aforementioned engine parameters and torque mapping in the PCM, an output torque of the engine may be estimated. Once the output torque of the engine is estimated, the output torque may be adjusted to a desired value. To adjust the output torque, various parameters, such as the flow of air into the engine (via adjustment of a throttle plate, for example) and/or ignition timing or angle may be adjusted.

However, at cold start up and before an engine has reached a certain temperature during an idling process, a closed loop feedback system may not be appropriate for controlling various engine parameters. Since engine parameters may vary and fluctuate from expected values when an engine temperature is below a certain value, an open loop or feedforward feedback control may be used until the engine reaches a certain operating temperature. One advantage of using open-loop feedback control before an engine reaches a threshold temperature is that a significant decrease may be made in the amount of data that needs to be collected, analyzed and stored for engine control. For example, a large amount torque control mapping data would be required to correctly predict output torque of the engine for each temperature prior to warm-up. Another advantage of open-loop feedback may be a decrease in noise, vibration, and/or torque fluctuations associated with closed-loop feedback control, such as when engine parameters are at unexpected values due to engine operating temperature.

Figure 2:
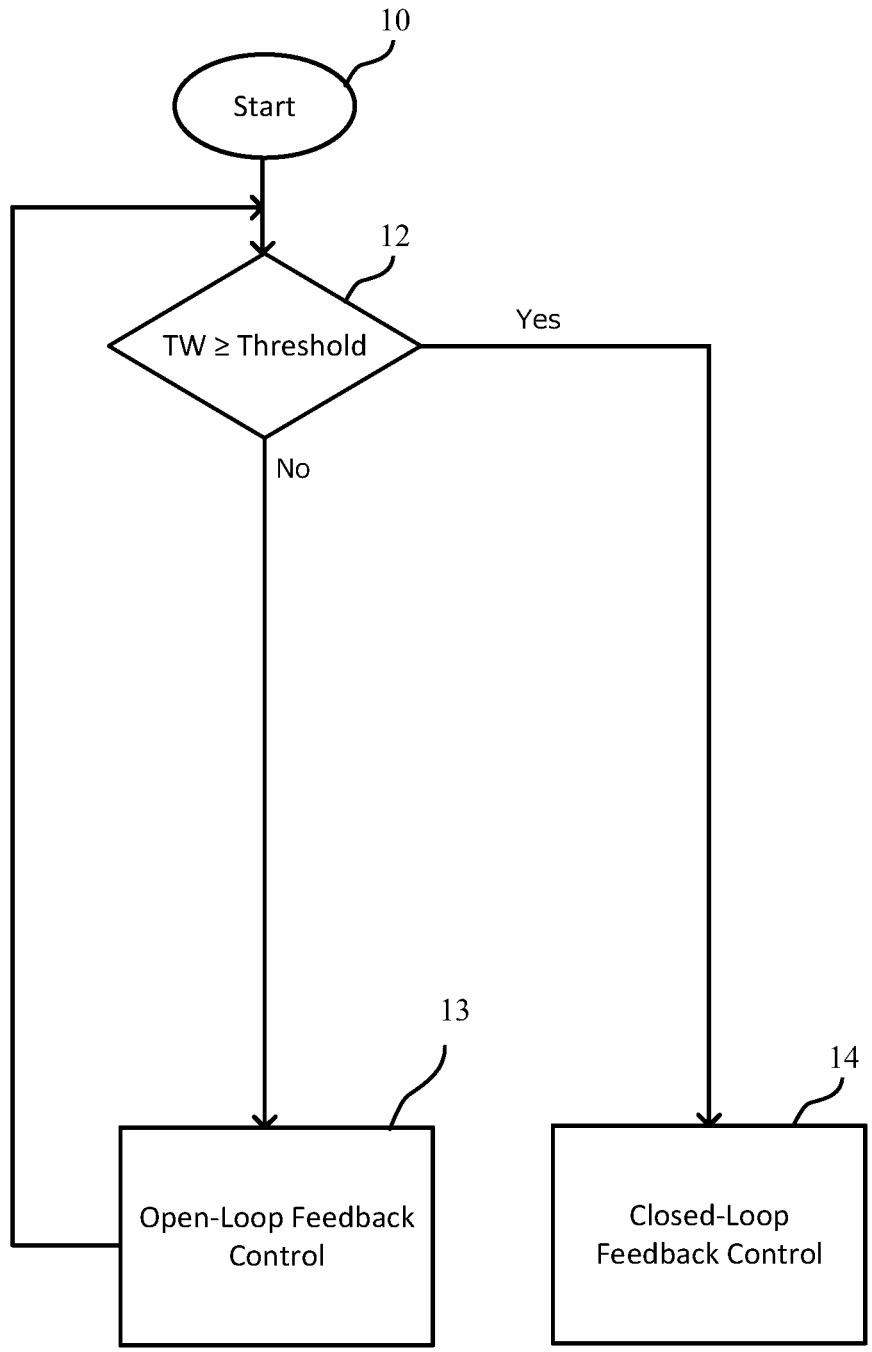
FIG. 2 is a diagram for outlining a process in accordance with one aspect of the disclosure.
Figure 3:
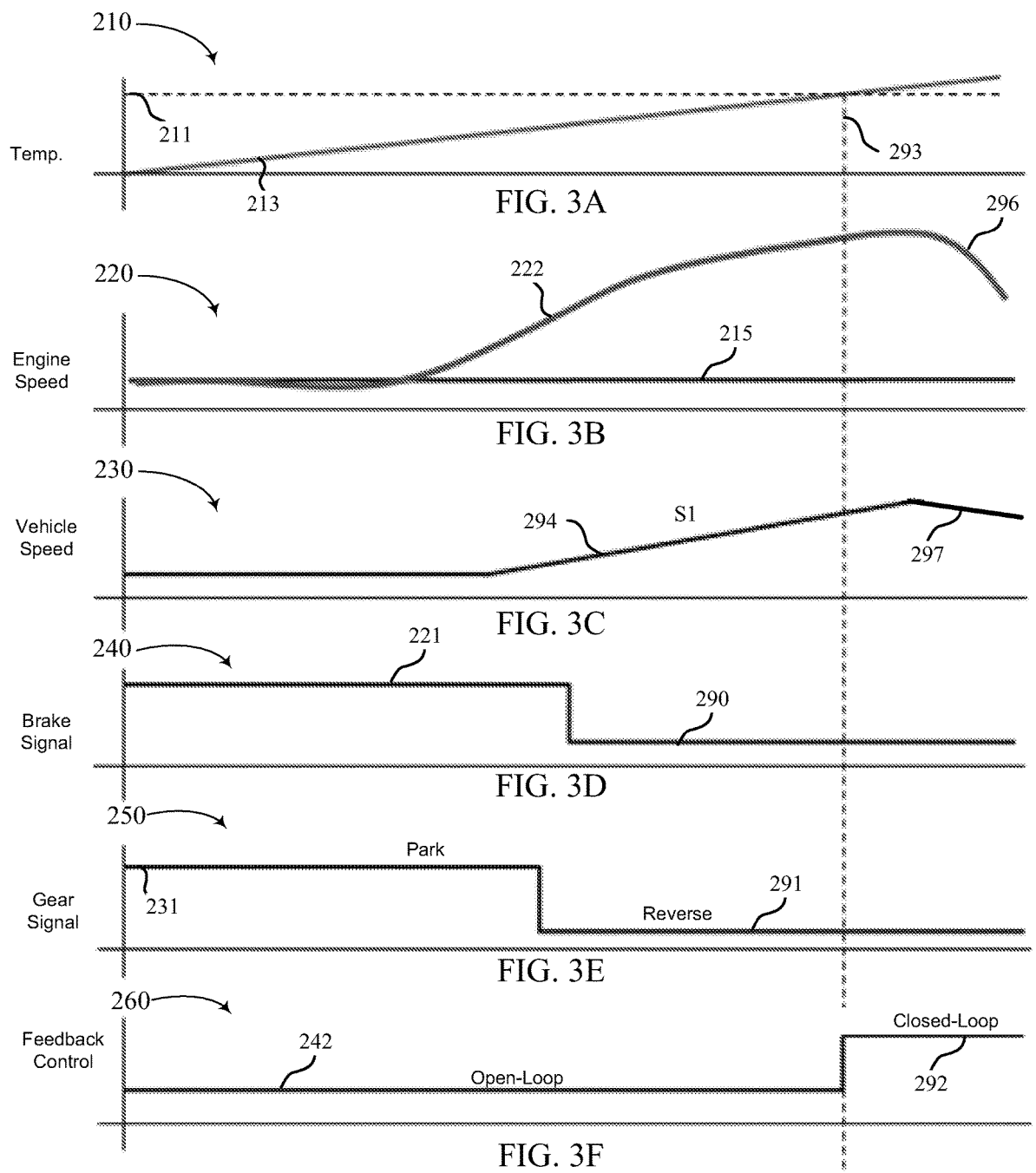
FIGS. 3A-F are a series of time charts showing one example of idle feedback control switching in accordance with one aspect of the disclosure.

FIG. 2 is a flow chart of one example of feedback control switching operation usable with an engine torque control system. Once an engine is started 10, a temperature of the engine may be monitored. In one example, the temperature of the engine may be determined by monitoring a coolant and/or water temperature ("TW"). When the value TW is not greater than or equal to a threshold value, an open-loop or feedforward feedback control 13 may be used to manage engine torque. When the engine warms up to or above a threshold temperature, the feedback control may be switched to closed-loop at step 14. In the open-loop or feedforward mode 13, engine torque and engine parameters that effect engine torque may be controlled based on stored pre-programmed values, for example. In one example implementation, the stored pre-programmed values may be based on testing data. Pre-programmed engine parameters may be stored in the PCM module 108 (FIG. 1) (e.g., in memory 120, shown in FIG. 1), for example.

One disadvantage of an open-loop or feedforward feedback control is that engine speed may increase steadily or deviate due to variations in sensor output values and parameters. FIGS. 3A-3F show an example of such an occurrence in a time-correlated format, wherein the x-axis of each graph represents time. The y-axis of each graph represents the quantity stated in each graph's y-axis label or along each plot. As shown in FIG. 3A, graph 210 represents one example of an engine temperature curve, which may for example be a coolant temperature. Graph 220 in FIG. 3B shows curves of a target engine speed 215 and an actual engine speed 222. The actual engine speed 222 shown in FIG. 3B may for example be an engine rotational speed in RPM. Graph 230 in FIG. 3C shows a curve of vehicle speed. Graph 240 of FIG. 3D shows one example of a brake signal curve, and graph 250 of FIG. 3E shows one example of a gear signal (park or reverse) curve. Graph 260 in FIG. 3F represents operation of a feedback control scheme (open-loop or closed-loop).

As shown in FIG. 3A, during an initial warmup, a temperature 213 may fall below a threshold temperature 211. While the temperature remains below the threshold temperature, torque may be controlled using open-loop or feedforward feedback 242 (FIG. 3F). However, while open-loop feedback is used, actual engine speed 222 (FIG. 3B) may begin to increase beyond an expected or target engine speed 215 (FIG. 3B). While a vehicle is in a neutral gear or park gear 231 (FIG. 3E) engine speed may increase without any adverse effects, since no power is transmitted to the wheels of the vehicle. Similarly, if a vehicle brake is fully applied while a vehicle is placed into a reverse, the vehicle may remain stationary. However, if a vehicle is placed in a reverse gear 291 (FIG. 3E) and the brake is released 290 (FIG. 3D), the vehicle may begin to increase in speed as shown by curve 294 (FIG. 3C) due to the increase in actual engine speed 222 (FIG. 3B). While such a phenomenon may also be applicable to a forward gear operation, the reverse gear in vehicle transmission is generally taller than the first forward gear of a vehicle transmission. Thus, since a taller gear has less gear reduction and a lower numerical ratio, a reverse gear speed may be higher for a given engine RPM than a first forward gear. Accordingly, if engine speed is increased beyond an expected or target engine speed 215 (FIG. 3B), vehicle speed in reverse may increase beyond an intended reverse speed S1 (FIG. 3C). As shown in FIG. 3A, once a temperature increases to a threshold value 211, closed loop feedback control 292 (FIG. 3F) is enabled, and the engine speed may begin to decrease and converge to an actual engine speed 296 (FIG. 3B), closer to a target or expected engine speed 215 (FIG. 3B). The decrease in engine speed may cause the vehicle reverse speed to begin to decrease as shown at 297 (FIG. 3C). Accordingly, for at least the aforementioned reasons, it may be desirable to implement closed loop feedback when a vehicle is placed in a reverse gear and/or travels in a reverse direction.

Figure 4:
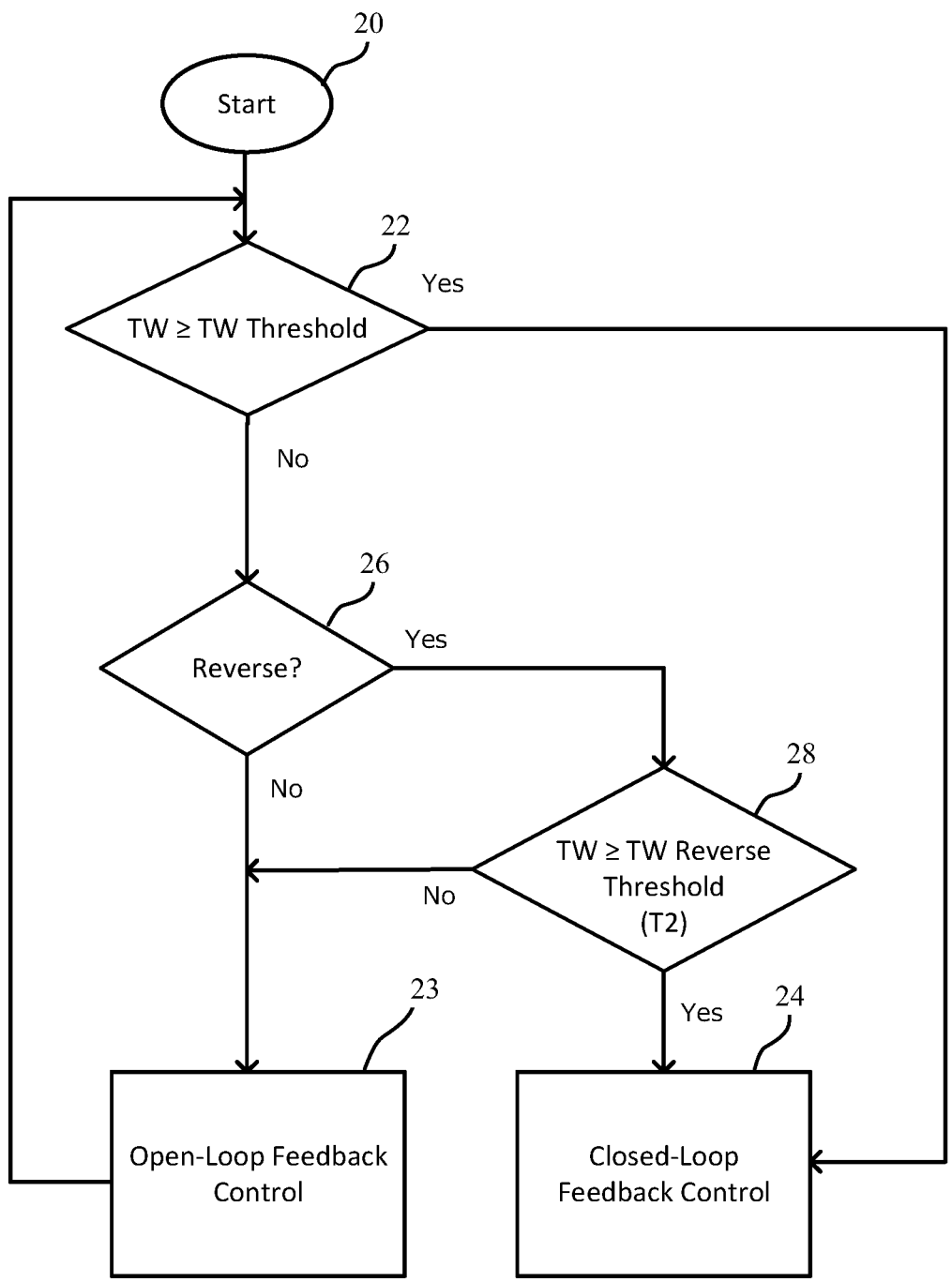
FIG. 4 is a diagram for outlining a process in accordance with one aspect of the disclosure.
Figure 5:
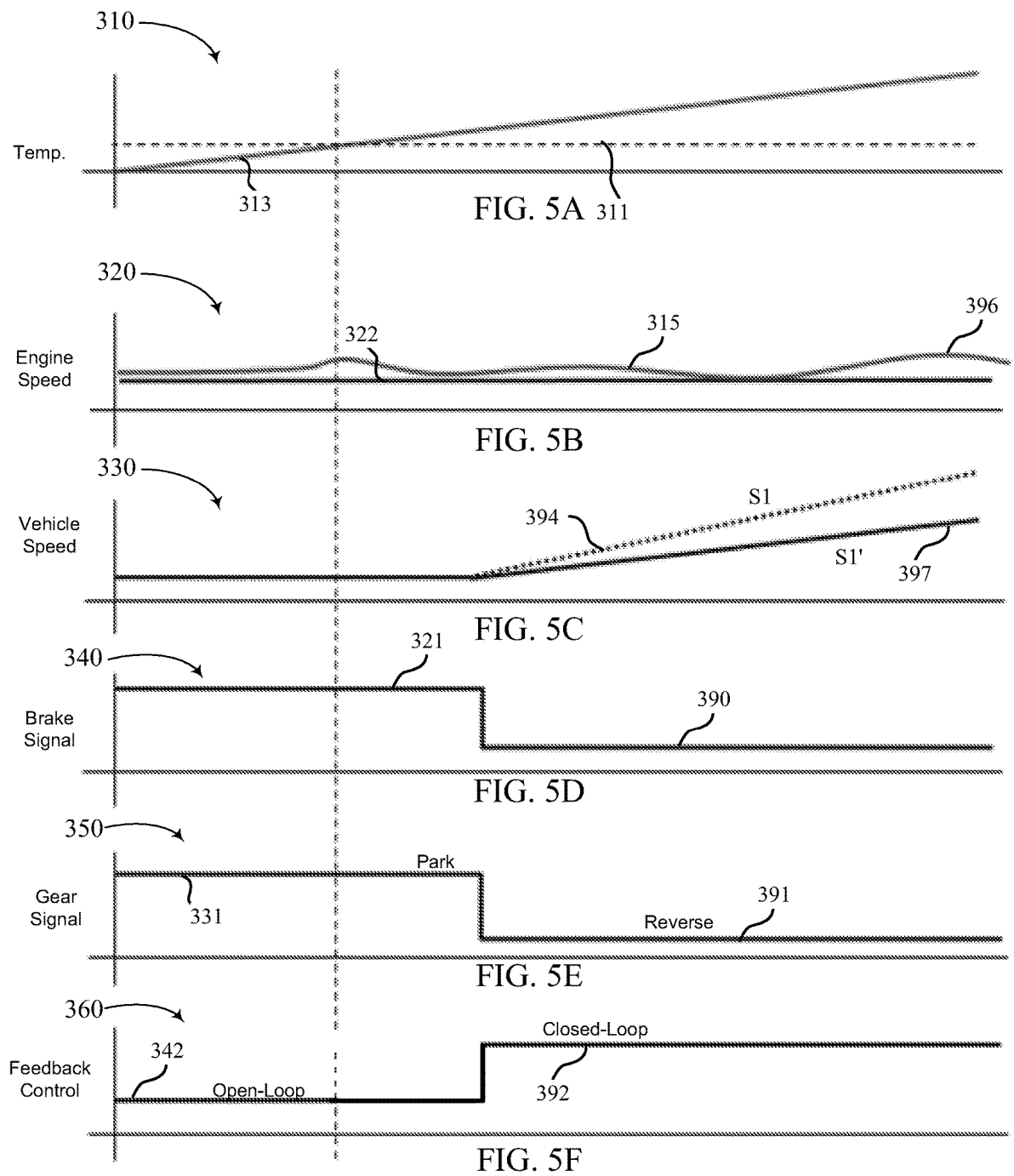
FIGS. 5A-F are a series of time charts showing one example of idle feedback control switching in accordance with one aspect of the disclosure.

FIG. 4 is a flow chart of one example of feedback control switching operation with the addition of the switching from an open-loop feedback control to a closed loop feedback control once the vehicle is placed in reverse and/or reverse movement of the vehicle is detected. Once an engine is started 20, the temperature of the engine is monitored. In one example, the temperature of the engine may be determined by monitoring a coolant and/or water temperature TW. If engine temperature is above or equal to the threshold value in step 22, closed-loop feedback control 24 is used. If the temperature is determined to be below the threshold value, the determination is made if a vehicle is in a reverse gear and/or if the vehicle is traveling in a reverse direction at step 26. If a vehicle is not in a reverse gear and/or traveling in a reverse direction, open-loop feedback control 23 is used. However, if at step 26, the vehicle is determined to be in a reverse gear and/or traveling in a reverse direction, closed loop feedback control 24 is used.

By using the additional variable of a reverse gear signal and/or reverse travel of the vehicle, engine speed at idle and thus vehicle speed in a reverse gear may be more consistently controlled. FIGS. 5A-5F show one example of such control activity in a time-correlated format wherein the x-axis of each graph represents time. The y-axis of each graph represents the quantity stated in each graph's y-axis label or along each plot. As shown in FIG. 5A, graph 310 represents one example of an engine temperature curve, which may for example be a coolant temperature. Graph 320 in FIG. 5B shows a target engine speed 315 and an actual engine speed 322. Graph 330 in FIG. 5C shows an example of vehicle reverse speed S1 when an open-loop feedback control system is used when operating a vehicle in reverse. Further, graph 330 shows a vehicle reverse speed St when a closed-loop feedback control system is used when operating the vehicle in reverse. Graph 340 of FIG. 5D shows one example of a brake signal curve, and graph 350 of FIG. 5E shows one example of a gear signal (park or reverse) curve. Graph 360 of FIG. 5F represents a feedback control scheme (open-loop or closed-loop).

As shown in FIG. 5A, during an initial warmup, the temperature 313 may fall below a threshold temperature 311. While the temperature remains below the threshold temperature, torque may be controlled using open-loop or feedforward feedback 342 (FIG. 5F). However, while open-loop feedback is used, actual engine speed 322 (FIG. 5B) may begin to increase beyond an expected or target engine speed 315 (FIG. 5B). While the vehicle is in a neutral gear or park 331 (FIG. 5E), engine speed may increase without any adverse effects since no power is transmitted to the wheels of the vehicle. Similarly, if the vehicle brake is fully applied 321 (FIG. 5D), while a vehicle is placed in reverse gear, the vehicle remains stationary.

However, once the vehicle is placed in a reverse gear 391 (FIG. 5E), the feedback control switches from open-loop feedback 342 (FIG. 5F) to closed-loop feedback 392 (FIG. 5F). By switching to closed-loop feedback, engine speed 315 (FIG. 5B) may remain closer to a target engine speed 322 (FIG. 5B). Accordingly, vehicle speed in reverse St (FIG. 5C) may be lower than a vehicle speed S1 (FIG. 5C) when using the methods shown in FIGS. 2 and 3. Thus, reverse gear speed may be prevented from inappropriately increasing beyond an intended reverse speed. Accordingly, the system provides advantages in controlling a vehicle speed in reverse while still maintaining the advantages of an open-loop feedback control system when a vehicle is idled in park, neutral, or a forward gear.

Figure 6:
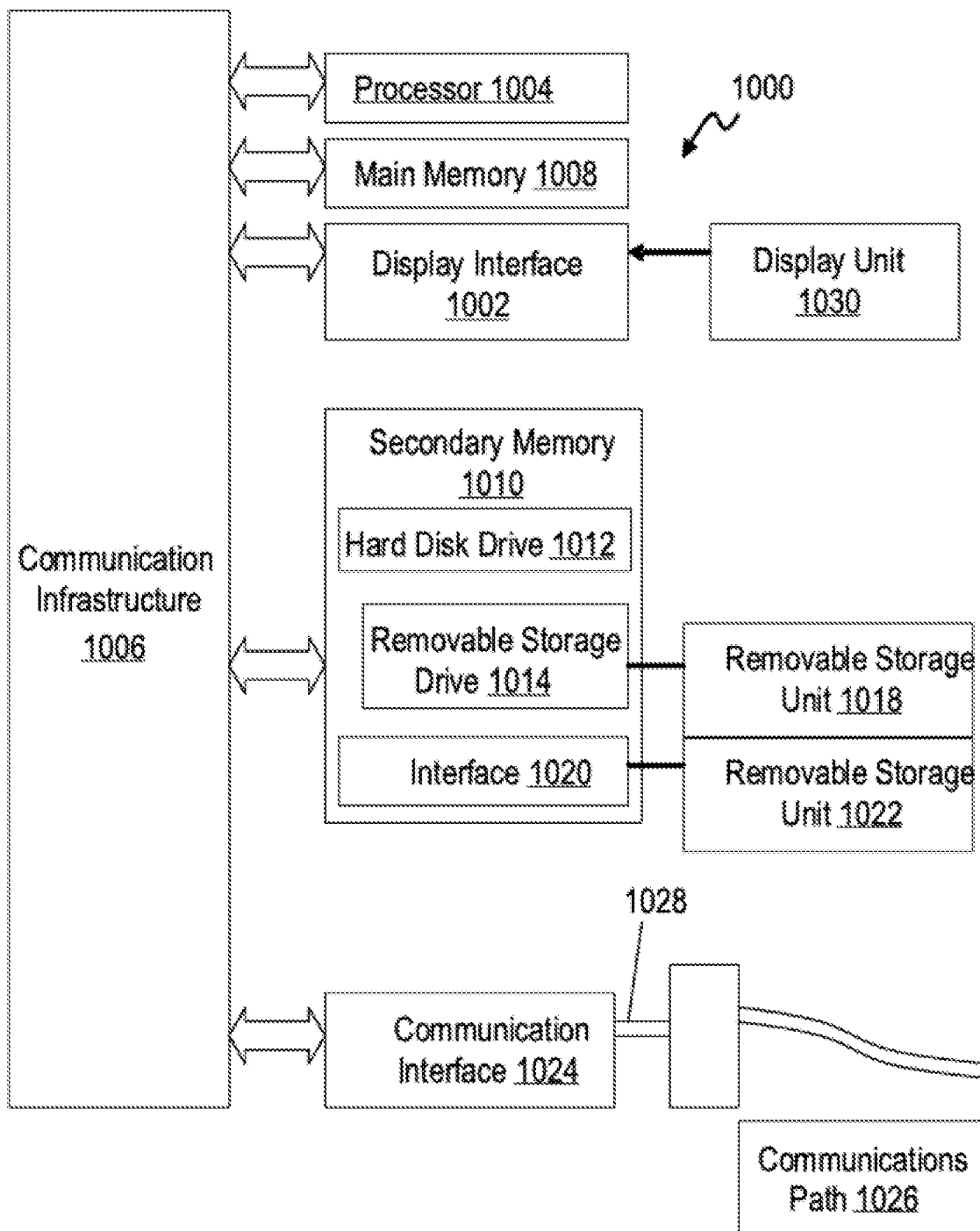
FIG. 6 illustrates an example computer system for an electronic system in accordance with an aspect of the disclosure.

Various aspects of the abovementioned idle control and various system features shown and described in relation to FIGS. 1-5F may be implemented using hardware, software, or a combination thereof and may be implemented in one or more computer systems or other processing systems. In an aspect of the present disclosure, features are directed toward one or more computer systems capable of carrying out the functionality of the data processing disclosed above. An example of such a computer system 1000 is shown in FIG. 6.

Computer system 1000 includes one or more processors, such as processor 1004. The processor 1004 is connected to a communication infrastructure 1006 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., that is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, that allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs).

Figure 7:
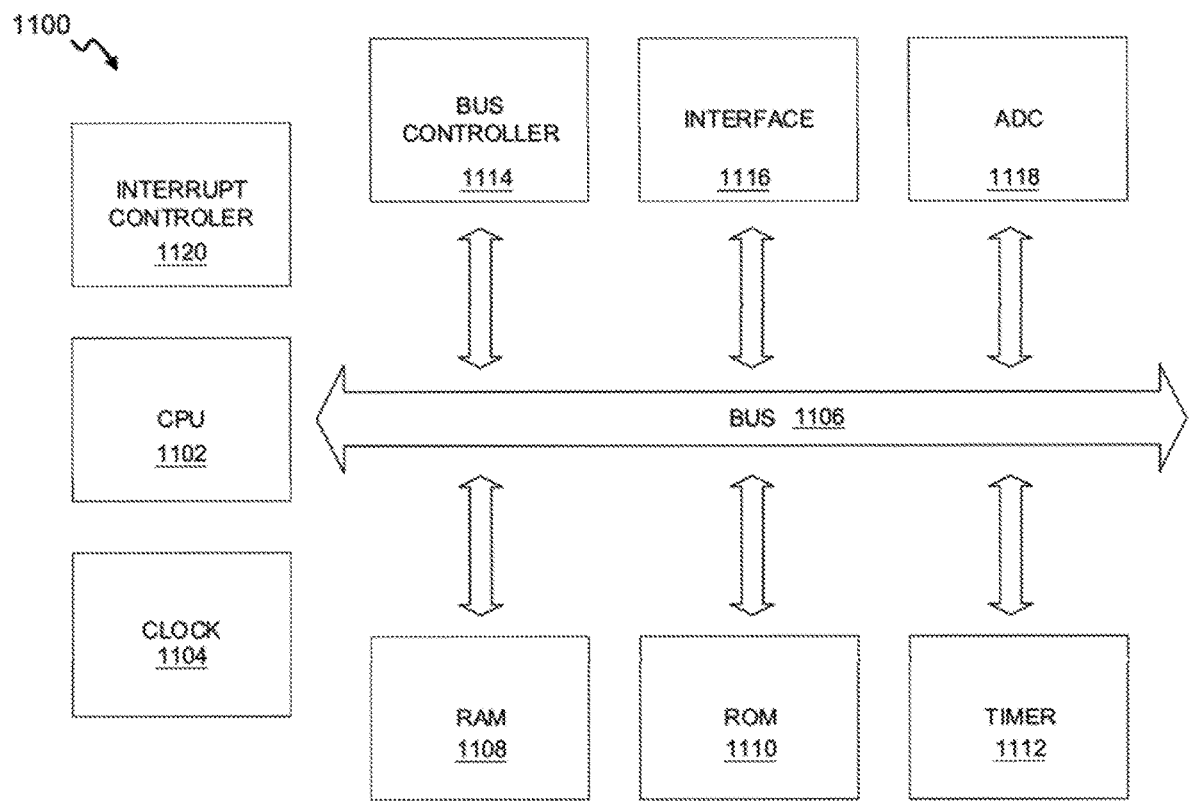
FIG. 7 is an example microcontroller in accordance with an aspect of the disclosure.

In some implementations, one or more microcontrollers may be implemented for carrying out certain features of the present disclosure, such as control features contained the engine and transmission control and system 108 of FIG. 1 and/or the torque control and feedback switching methods discussed with relation to FIGS. 1-5E. An example of such a microcontroller 1100 is shown in FIG. 7. The microcontroller 1100 includes a central processing unit (CPU) 1102, random access memory RAM 1108, read only memory (ROM) 1110, a timer 1112, an omnibus (BUS) controller 1114, an interface 1116, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU 1102 to suspend operations of the CPU 1102. The interrupt controller 1120 may transmit an interrupt signal to the CPU 1102 when an event requires immediate attention of the CPU 1102.

The RAM 1108 may include one or more static random access memory (SRAM), dynamic random access memory (DRAM), synchronous dynamic random-access memory (SDRAM), double data rate synchronous dynamic random-access memory (DDR SDRAM), or other suitable volatile memory. The ROM 1110 may include one or more programmable read only memory (PROM), erasable programmable read only memory (EPROM), electrically erasable programmable read only memory (EEPROM), flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes usage of the BUS 1106 within the microcontroller 1100. The ADC 1118 allows the microcontroller 1100 to send out pulses to signal other devices.

The interface 1116 is an input/output device that allows the microcontroller 1100 to exchange information with other devices. In some implementations, the interface 1116 may include one or more of a parallel port, a serial port, or other computer interfaces.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the above-mentioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A method for controlling the torque of an internal combustion engine of a vehicle comprising:
   detecting at least one of a reverse gear activation or a reverse movement of the vehicle; wherein feedback control of the internal combustion engine is switched from open-loop control to closed-loop control upon detection of at least one of a reverse gear activation or a reverse movement of the vehicle detecting an engine temperature, wherein the engine torque control is switched from the open-loop control to the closed-loop control once the engine temperature is determined to equal or exceed a threshold value.

2. The method for controlling the torque of an internal combustion engine of claim 1, wherein an engine temperature is determined based on an engine coolant temperature.

3. The method for controlling the torque of an internal combustion engine of claim 1 wherein the closed-loop control adjusts torque based on mapping data comprising at least one of an intake air amount, a fuel intake amount, and a detected engine speed.

4. The method for controlling the torque of an internal combustion engine of a vehicle of claim 1, wherein an engine torque is controlled by adjusting at least one of an intake throttle plate position and an engine ignition timing.

5. The method for controlling the torque of an internal combustion engine of a vehicle of claim 1, wherein when the torque is controlled using the open-loop control, at least one of an intake throttle plate position, and an engine ignition timing based on data stored in a memory of a powertrain control module.

6. A system for controlling the torque of an internal combustion engine of a vehicle comprising: a control module having a memory and a processor, wherein the control module is capable of controlling an engine output torque at idle, the control module determining at least one of a reverse gear activation or a reverse movement of the vehicle; wherein the control module is configured to switch feedback control of the engine torque from open-loop control to closed-loop control upon detection of at least one of a reverse gear activation or a reverse movement of the vehicle determining an engine temperature at the control module, wherein the control module switches the engine torque control from the open-loop control to the closed-loop control once the engine temperature is determined to equal or exceed a threshold value.

7. The system for controlling the torque of an internal combustion engine of claim 6, wherein an engine temperature is determined based on an engine coolant temperature.

8. The system for controlling the torque of an internal combustion engine of claim 6 wherein during a closed-loop control, the control module adjusts torque based on mapping data comprising at least one of an intake air amount, a fuel intake amount, and a detected engine speed.

9. The system for controlling the torque of an internal combustion engine of a vehicle of claim 6, wherein the control module adjusts the engine torque by adjusting at least one of an intake throttle plate position and an engine ignition timing.

10. The system for controlling the torque of an internal combustion engine of a vehicle of claim 6, wherein when the torque is controlled using the open-loop control, the control module adjusts at least one of an intake throttle plate position and an engine ignition timing based on data stored in a memory.

11. A computer-readable storage medium comprising instructions which, when executed by a computer, cause the computer to carry out a method for controlling an idle torque of an internal combustion engine, the method comprising: detecting at least one of a reverse gear activation or a reverse movement of the vehicle; wherein feedback control of the internal combustion engine is switched from open-loop control to closed-loop control upon detection of at least one of; a reverse gear activation; or a reverse movement of the vehicle detecting an engine temperature, wherein the engine torque control is switched from the open-loop control to the closed-loop control once the engine temperature is determined to equal or exceed a threshold value.

12. The computer-readable storage medium comprising instructions which, when executed by a computer, cause the computer to carry out a method for controlling an idle torque of an internal combustion engine of claim 11, wherein an engine temperature is determined based on an engine coolant temperature.

13. The computer-readable storage medium comprising instructions which, when executed by a computer, cause the computer to carry out a method for controlling an idle torque of an internal combustion engine of claim 11, wherein the closed-loop control is used to adjust torque based on mapping data comprising at least one of an intake air amount, a fuel intake amount, and a detected engine speed.

14. The computer-readable storage medium comprising instructions which, when executed by a computer, cause the computer to carry out a method for controlling an idle torque of an internal combustion engine of claim 11, wherein an engine torque is controlled by adjusting at least one of an intake throttle plate position and an engine ignition timing.

15. The computer-readable storage medium comprising instructions which, when executed by a computer, cause the computer to carry out a method for controlling an idle torque of an internal combustion engine of claim 11, wherein when the torque is controlled using the open-loop control, at least one of an intake throttle plate position and an engine ignition timing is controlled based on data stored in a memory of a powertrain control module.

* * * * *